United States Patent
Muller et al.

(10) Patent No.: US 8,793,659 B2
(45) Date of Patent: Jul. 29, 2014

(54) PHASE-BASED TESTING OF OPERATING SYSTEMS

(75) Inventors: Petr Muller, Brno (CZ); Ondrej Hudlicky, Brno (CZ); Petr Splichal, Brno (CZ); Ales Zelinka, Brno (CZ); Jan Hutař, Staré Město pod Sněžníkem (CZ)

(73) Assignee: Red Hat, Inc., Raleigh, NC (US)

( * ) Notice: Subject to any disclaimer, the term of this patent is extended or adjusted under 35 U.S.C. 154(b) by 620 days.

(21) Appl. No.: 12/704,428

(22) Filed: Feb. 11, 2010

(65) Prior Publication Data

US 2011/0197181 A1 Aug. 11, 2011

(51) Int. Cl.
*G06F 9/44* (2006.01)
*G06F 11/36* (2006.01)

(52) U.S. Cl.
USPC ........... 717/127; 717/124; 717/125; 717/135; 714/724; 714/733

(58) Field of Classification Search
CPC ....................................................... G06F 11/36
See application file for complete search history.

(56) References Cited

U.S. PATENT DOCUMENTS

| | | | | |
|---|---|---|---|---|
| 6,031,990 | A * | 2/2000 | Sivakumar et al. | 717/124 |
| 6,134,674 | A * | 10/2000 | Akasheh | 714/33 |
| 6,543,047 | B1 * | 4/2003 | Vrhel et al. | 717/121 |
| 6,754,888 | B1 * | 6/2004 | Dryfoos et al. | 717/127 |
| 6,959,433 | B1 * | 10/2005 | Morales et al. | 717/127 |
| 7,222,265 | B1 * | 5/2007 | LeSuer et al. | 714/38.1 |
| 7,353,439 | B2 * | 4/2008 | Lin | 714/724 |
| 7,895,565 | B1 * | 2/2011 | Hudgons et al. | 717/106 |
| 7,921,345 | B2 * | 4/2011 | Trump et al. | 714/733 |
| 8,140,578 | B2 * | 3/2012 | Johnson et al. | 707/791 |
| 2003/0005417 | A1 * | 1/2003 | Gard et al. | 717/135 |
| 2005/0172271 | A1 * | 8/2005 | Spertus et al. | 717/125 |
| 2007/0006041 | A1 * | 1/2007 | Brunswig et al. | 714/38 |
| 2007/0043956 | A1 * | 2/2007 | El Far et al. | 713/189 |
| 2008/0270998 | A1 * | 10/2008 | Zambrana | 717/131 |
| 2010/0017427 | A1 * | 1/2010 | Johnson et al. | 707/102 |
| 2010/0146489 | A1 * | 6/2010 | Ortiz | 717/128 |

OTHER PUBLICATIONS

J. L. Crowley et al., "Issues in the Full Scale Use of Formal Methods for Automated Testing", [Online], ACM 1996, pp. 71-78, [Retrieved from Internet on Mar. 7, 2014], <http://delivery.acm.org/10.1145/230000/226303/p71-crowley.pdf>.*

Hareton K. N. Leung et al., "A Cost Model to Compare Regression Test Strategies", [Online], IEEE 1991, pp. 201-208, [Retrieved from Internet on Mar. 7, 2014], <http://ieeexplore.ieee.org/stamp/stamp.jsp?tp=&arnumber=160330>.*

Christian Murphy et al., "Quality Assurance of Software Applications Using the In Vivo Testing Approach", [Online], IEEE 2009, pp. 111-120, [Retrieved from Internet on Mar. 7, 2014], <http://ieeexplore.ieee.org/stamp/stamp.jsp?tp=&arnumber=4815343>.*

(Continued)

*Primary Examiner* — Thuy Dao
*Assistant Examiner* — Ziaul A Chowdhury
(74) *Attorney, Agent, or Firm* — Lowenstein Sandler LLP

(57) ABSTRACT

A method and system for phase-based testing of an operating system. The method may include detecting a failure when running a test of an operating system, identifying a phase in which the failure has occurred, and reporting the failure to a user, indicating the identified phase in which the failure has occurred.

9 Claims, 4 Drawing Sheets

(56) References Cited

OTHER PUBLICATIONS

Joakim Aidemark et al., "GOOFI : Generic Object-Oriented Fault Injection Tool", [Online], IEEE 2001, pp. 1-6, [Retrieved from Internet on Mar. 7, 2014], <http://ieeexplore.ieee.org/stamp/stamp.jsp?tp=&arnumber=941394>.*

* cited by examiner

PHASE-BASED TESTING OF OPERATING SYSTEMS

TECHNICAL FIELD

Embodiments of the present invention relate to testing software. Specifically, embodiments of the invention relate to a method and system for phase-based testing of operating systems.

BACKGROUND

Quality assurance and testing of an operating system is directed to a successful reproduction of a failure occurred during the execution of the operating system and appropriate reporting of the failure. The reproduction of the failure often involves quite sophisticated setup and teardown of the testing environment, in addition to the actual testing. In particular, various applications may need to be tested in the same run, often with various and test-specific configurations. Each such test may require a different testing environment. Changing the testing environment may result in a failure as well. This setup failure should be treated differently from a failure occurred during the actual test of the operating system. Additionally, such a setup of the testing environment needs to be properly cleaned up after the test itself to ensure that the setup does not affect the run of the rest of the test batch. Consequently, when a testing tool reports a failure, a quality assurance engineer needs to figure out whether the failure has resulted from an error in the test setup or cleanup or from an error in the tested software itself.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of a method and system for phase-based testing of an operating system are described herein. Testing of an operating system may consist of multiple phases. These phases may include, for example, a setup phase that configures a test environment, a test phase that detects errors in software being tested, and a cleanup phase that restores the test environment to its initial state.

In one embodiment, testing of an operating system is defined by a script that specifies various phases and identifies functions to be performed during each phase and conditions to be satisfied after the functions are performed. A phase-based test system monitors the execution of the script and detects conditions that have failed. When the phase-based test system detects that a condition has failed, the phase-based test system identifies the phase in which the failure occurred, and takes an action in accordance with the identified phase.

In some embodiments, if a failure occurs during the setup phase, the phase-based test system issues a warning indicating that the test has not been setup properly, and stops the execution of the test. Alternatively, if the failure occurs during the test phase, the phase-based test system reports the failure, provides information relevant to the failure, and continues running the test. Yet alternatively, if the failure occurs during the cleanup phase, the phase-based test system issues a warning indicating that the after-test cleanup has not been performed properly.

Accordingly, embodiments of the invention automatically differentiate between various failure contexts and sources, allowing a tester to distinguish between a failure caused by an error in setting up or cleaning up a test and a failure caused by an error in the software being tested. In addition, by dividing tests into phases, embodiments of the invention avoid running irrelevant tests in case of a failed setup, and allow a tester to execute only selected parts of larger test suites, thus saving time and resources and simplifying development and debugging of more complex tests.

Figure 1:
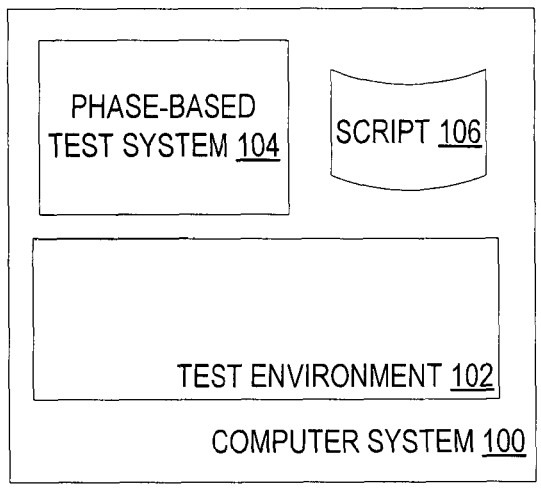
FIG. 1 illustrates a testing framework in accordance with some embodiments of the invention.

FIG. 1 illustrates a testing framework in accordance with some embodiments of the invention. The testing framework is provided by a computer system 100 that may include one or more computing devices such as server computers, personal computers, laptops, PDAs, mobile phones, gateway computers, etc. The computer system 100 hosts testing environment 102 that may include hardware required to run a test of an operating system, the operating system to be tested and other software (e.g., applications, services, etc.) that need to be tested together with the operating system. In addition, the testing environment 102 may include one or more data storage devices that store files and databases to be used in testing.

The computer system 100 may also host a phase-based test system 104 that provides test services such as logging, result checking, performance measurement, etc. In addition, the phase-based test system 104 detects failures during the test execution, identifies phases during which failures have occurred, and performs actions depending on the identified phases. The phases may include, for example, a setup phase that configures the test environment 102 (e.g., by adding/removing services, placing files in appropriate locations, etc.), a test phase that detects errors in the operating system and other software being tested, and a cleanup phase that restores the test environment to its initial state.

In one embodiment, testing of the operating system is defined by a script 106. The script 106 can be created by a test author who may be the same person as a tester or a different person. The script 106 may specify various phases and identify functions to be performed during each phase and conditions to be satisfied after the functions are performed. An exemplary script will be discussed in more detail below.

The phase-based test system 154 provides functions (e.g., a library of test functions) that are invoked during the execution of the script 106. If during the execution of the script, a condition pertaining to an executed function has failed, the phase-based test system 104 identifies a phase in which the failure has occurred, and takes an action in accordance with the identified phase. For example, if a failure occurs during the setup phase, the phase-based test system 104 issues a warning indicating that the test has not been setup properly, and causes the execution of the test to be stopped. Alternatively, if the failure occurs during the test phase, the phase-based test system 104 reports the failure, provides information relevant to the failure, and continues running the test. Yet alternatively, if the failure occurs during the cleanup phase, the phase-based test system 104 issues a warning indicating that the after-test cleanup has not been performed properly.

In some embodiments, the phase-based test system 154 includes a script authoring tool that assists test authors in creating scripts as will be discussed in more detail below. The script authoring tool may reside on the computer system 100 and the test author may use the computer system 100 to create the script. Alternatively, the script authoring tool may reside on a server computer (not shown) coupled to the computer system 100 via a network (e.g., a public network such as Internet or a private network such as LAN). A test author may access the script authoring tool remotely to create the script. The test author may then send the script or a link to the script to a tester (e.g., in an email message). Alternatively, the script may be stored on the server and the tester may access (e.g., via a network) a list of scripts stored on the server and select a desired script.

In addition, the tester can receive testing services via the computer system 100 or remotely via a client computer (not shown) coupled to the computer system 100 via a network. It should be noted that various network configurations other than those described above can be used with embodiments of the present invention without loss of generality.

Figure 2:
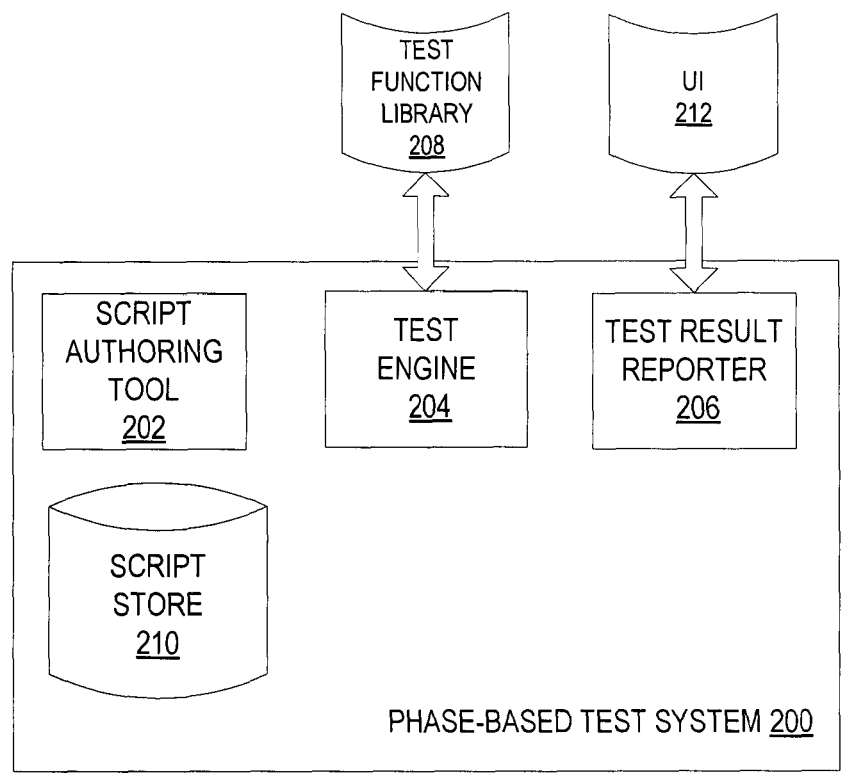
FIG. 2 is a block diagram of one embodiment of a phase-based test system.

FIG. 2 is a block diagram of one embodiment of a phase-based test system 200. The phase-based test system 200 may include a script authoring tool 202, a test engine 204 and a test result reporter 206.

The script authoring tool 202 assists test authors in creating scripts. In particular, the script authoring tool 202 may create the structure of a test (e.g., by specifying multiple phases of the test in a test script), provide functions that can be included in the test, and store the resulting script in a script store 210 hosted by a data storage device, which may consist of one or more types of removable storage and/or one or more types of non-removal storage. The script authoring tool 202 may provide functions by displaying a list of available functions to a test author and allowing the test author to select desired functions. In addition, the script authoring tool 202 may specify conditions (also referred to as assertions) that need to be satisfied after corresponding functions are performed. For example, a function that installs an RPM package may have a corresponding condition that checks whether the PRM package has been in fact installed. The functions and corresponding conditions can be stored in a test function library 208. A script can be written in any scripting language (e.g., bash language).

The test engine 204 manages the test function library 208 that includes various functions and corresponding conditions. When a script is run, the test engine 204 invokes functions and conditions identified in the script, detects a condition failure, and identifies the phase in which the failure has occurred. Depending on the identified phase, the test engine 204 determines what action should be taken. For example, if a condition fails inside a setup phase, the test engine 204 instructs the test result reporter 206 to display a warning in a user interface 212, indicating that the test did not run successfully and thus its result is not relevant. In addition, in some embodiments, the test engine 204 causes the script to stop running to refrain from executing all test type phases included in the script after a setup phase failure since such tests would not provide meaningful results due to the setup phase failure.

When a condition fails inside a test type phase, the test engine 204 considers such a failure a successful reproduction of an issue, and instructs the test result reporter 206 to report this failure and provide information pertaining to the failure in the UI 212. This information may include, for example, the instruction and/or the condition that have caused the failure and performance measurements at the time of failure. When a condition fails inside a cleanup phase, the test engine 204 instructs the test result reporter 206 to display a warning on the UI 212, indicating that some failures can be caused by a failed cleanup in one of the earlier tests.

The following is an example of a script for testing a kernel.

```
PACKAGE="systemtap"
rlJournalStart
rlPhaseStartSetup Setup 'Installing kernel supporting stuff'
    PACKAGE=systemtap
    RUNNING_KERNEL="`uname -r`"
    RUNNING_KERNEL_FILE="`find /boot -name vmlinuz-$RUNNING_KERNEL`"
    RUNNING_KERNEL_RPM="`rpm -qf $RUNNING_KERNEL_FILE`"
    RPM_NAME="`rpm -q --queryformat '%{name}' $RUNNING_KERNEL_RPM`"
    RPM_VERSION="`rpm -q --queryformat '%{version}' $RUNNING_KERNEL_RPM`"
    RPM_RELEASE="`rpm -q --queryformat '%{release}' $RUNNING_KERNEL_RPM`"
    RPM_ARCH="`rpm -q --queryformat '% {arch}' $RUNNING_KERNEL_RPM`"
    rlRpmInstall $RPM_NAME-devel $RPM_VERSION $RPM_RELEASE $RPM_ARCH
    rlAssertRpm $RPM_NAME-devel $RPM_VERSION $RPM_RELEASE $RPM_ARCH
    STAP_V="`rpm -q --queryformat '%{version}' systemtap`"
    STAP_R="`rpm -q --queryformat '%{release}' systemtap`"
    rlAssertRpm systemtap-runtime $STAP_V $STAP_R
rlPhaseEnd
rlPhaseStartSetup "Setting up users and groups"
    rlRun "useradd developer"
    rlRun "useradd user"
    rlRun "useradd both"
    groupadd stapusr
    groupadd stapdev
    rlRun "getent group stapdev" 0 "Checking if stapdev group exists"
    rlRun "getent group stapusr" 0 "Checking if stapusr group exists"
    rlRun "usermod -a -G stapdev developer"
    rlRun "usermod -a -G stapusr user"
    rlRun "usermod -a -G stapusr both"
    rlRun "usermod -a -G stapdev both"
    rlRun "useradd luser"
    mkdir /lib/modules/`uname -r`/systemtap
    rlRun "chown root /lib/modules/`uname -r`/systemtap"
    rlRun "chmod o-w /lib/modules/`uname -r`/systemtap"
    OUTPUT=`pwd`/output
```

```
    touch $OUTPUT
    rlRun "chmod a+rw $OUTPUT"
rlPhaseEnd
rlPhaseStartSetup "Creating kernel objects"
    rlRun "stap -m restricted -p4 restricted.stp"
    rlRun "stap -m free -p4 free.stp"
    rlRun "mv free.ko /lib/modules/`uname -r`/systemtap"
    RESKO=`pwd`/restricted.ko
    FREEKO=/lib/modules/`uname -r`/systemtap/free.ko
    rlAssertExists $RESKO
    rlAssertExists $FREEKO
rlPhaseEnd
rlPhaseStartTest "Testing restricted module"
    rlRun "staprun $RESKO &> $OUTPUT" 0 "Trying restricted module as root"
    rlAssertGrep "PASS" $OUTPUT || while read line; do rlLog "OUTPUT: $line"; done < $OUTPUT
    rlRun "su -c 'staprun $RESKO' developer &> $OUTPUT"
    rlAssertGrep "PASS" $OUTPUT || while read line; do rlLog "OUTPUT: $line"; done < $OUTPUT
    rlRun "su -c 'staprun $RESKO' both &> $OUTPUT"
    rlAssertGrep "PASS" $OUTPUT || while read line; do rlLog "OUTPUT: $line"; done < $OUTPUT
    rlRun "su -c 'staprun $RESKO' user &> $OUTPUT" 1,255 "Trying restricted module as stapusr member (shouldnt be allowed)"
    rlAssertGrep 'ERROR: Members of the \"stapusr\" group can only use modules within' $OUTPUT || while read line; do rlLog "OUTPUT: $line"; done < $OUTPUT
    rlAssertNotGrep "PASS" $OUTPUT || while read line; do rlLog "OUTPUT: $line"; done < $OUTPUT
    rlRun "su -c 'staprun $RESKO' luser &> $OUTPUT" 1,255 "Trying restricted module as normal user (shouldnt be allowed)"
    rlAssertGrep 'ERROR: You are trying to run (stap)|(systemtap) as a normal user.' $OUTPUT -E || while read line; do rlLog "OUTPUT: $line"; done < $OUTPUT
    rlAssertNotGrep "PASS" $OUTPUT || while read line; do rlLog "OUTPUT: $line"; done < $OUTPUT
rlPhaseEnd
rlPhaseStartTest "Testing free module"
    rlRun "staprun $FREEKO &> $OUTPUT" 0 "Trying free module as root"
    rlAssertGrep "PASS" $OUTPUT || while read line; do rlLog "OUTPUT: $line"; done < $OUTPUT
    rlRun "su -c 'staprun $FREEKO' developer &> $OUTPUT" 0 "Trying free module as stapdev member"
    rlAssertGrep "PASS" $OUTPUT || while read line; do rlLog "OUTPUT: $line"; done < $OUTPUT
    rlRun "su -c 'staprun $FREEKO' both &> $OUTPUT" 0 "Trying free module as both groups member"
    rlAssertGrep "PASS" $OUTPUT || while read line; do rlLog "OUTPUT: $line"; done < $OUTPUT
    rlRun "su -c 'staprun $FREEKO' user &> $OUTPUT" 0 "Trying free module as stapusr member"
    rlAssertGrep "PASS" $OUTPUT ||while read line; do rlLog "OUTPUT: $line"; done < $OUTPUT
    rlRun "su -c 'staprun $FREEKO' luser &> $OUTPUT" 1,255 "Trying free module as normal user (shouldnt be allowed)"
    rlAssertGrep 'ERROR: You are trying to run (stap)|(systemtap) as a normal user.' $OUTPUT -E || while read line; do rlLog "OUTPUT: $line"; done < $OUTPUT
    rlAssertNotGrep "PASS" $OUTPUT || while read line; do rlLog "OUTPUT: $line"; done < $OUTPUT
rlPhaseEnd
rlPhaseStartTest "Testing free module in nonroot directory"
    rlRun "chown luser /lib/modules/`uname -r`/systemtap"
    rlRun "staprun $FREEKO 2>&1 | tee $OUTPUT" 0 "Trying free module as root"
    rlAssertGrep "PASS" $OUTPUT || while read line; do rlLog "OUTPUT: $line"; done < $OUTPUT
    rlRun "su -c 'staprun $FREEKO' developer &> $OUTPUT" 0 "Trying free module as stapdev member"
    rlAssertGrep "PASS" $OUTPUT || while read line; do rlLog "OUTPUT: $line"; done < $OUTPUT
    rlRun "su -c 'staprun $FREEKO' both &> $OUTPUT" 0 "Trying free module as both groups member"
    rlAssertGrep "PASS" $OUTPUT || while read line; do rlLog "OUTPUT: $line"; done < $OUTPUT
    rlRun "su -c 'staprun $FREEKO' user &> $OUTPUT" 1,255 "Trying free module as stapusr member (shouldnt be allowed)"
    rlAssertGrep 'ERROR: Members of the \"stapusr\" group can only use modules within' $OUTPUT || while read line; do rlLog "OUTPUT: $line"; done < $OUTPUT
    rlAssertNotGrep "PASS" $OUTPUT || while read line; do rlLog "OUTPUT: $line"; done < $OUTPUT
    rlRun "su -c 'staprun $FREEKO' luser &> $OUTPUT" 1,255 "Trying free module as normal user (shouldnt be allowed)"
```

```
    rlAssertGrep 'ERROR: You are trying to run (stap)|(systemtap) as a normal user.'$OUTPUT
-E || while read line; do rlLog "OUTPUT: $line"; done < $OUTPUT
    rlAssertNotGrep "PASS" $OUTPUT || while read line; do rlLog "OUTPUT: $line"; done <
$OUTPUT
rlPhaseEnd
rlPhaseStartTest "Testing free module in world-writable directory"
    rlRun "chown root /lib/modules/`uname -r`/systemtap"
    rlRun "chmod o+w /lib/modules/`uname -r`/systemtap"
    rlRun "staprun $FREEKO &> $OUTPUT" 0 "Trying free module as root"
    rlAssertGrep "PASS" $OUTPUT || while read line; do rlLog "OUTPUT: $line"; done <
$OUTPUT
    rlRun "su -c 'staprun $FREEKO' developer &> $OUTPUT" 0 "Trying free module as stapdev
member"
    rlAssertGrep "PASS" $OUTPUT || while read line; do rlLog "OUTPUT: $line"; done <
$OUTPUT
    rlRun "su -c 'staprun $FREEKO' both &> $OUTPUT" 0 "Trying free module as both groups
member"
    rlAssertGrep "PASS" $OUTPUT || while read line; do rlLog "OUTPUT: $line"; done <
$OUTPUT
    rlRun "su -c 'staprun $FREEKO' user &> $OUTPUT" 1,255 "Trying free module as stapusr
member (shouldn't be allowed)"
    rlAssertGrep 'ERROR: Members of the \"stapusr\" group can only use modules within'
$OUTPUT
    rlAssertNotGrep "PASS" $OUTPUT || while read line; do rlLog "OUTPUT: $line"; done <
$OUTPUT
    rlRun "su -c 'staprun $FREEKO' luser &> $OUTPUT" 1,255 "Trying free module as normal
user (shouldnt be allowed)"
    rlAssertGrep 'ERROR: You are trying to run (stap)|(systemtap) as a normal user.' $OUTPUT
-E || while read line; do rlLog "OUTPUT: $line"; done < $OUTPUT
    rlAssertNotGrep "PASS" $OUTPUT || while read line; do rlLog "OUTPUT: $line"; done <
$OUTPUT
rlPhaseEnd
rlPhaseStartCleanup Cleanup
    rlRun "userdel developer"
    rlRun "userdel luser"
    rlRun "userdel user"
    rlRun "userdel both"
    rlRun "groupdel stapdev"
    rlRun "groupdel stapusr"
    rlRun "rm -f $FREEKO $RESKO $OUTPUT"
    rlRun "rm -rf /lib/modules/`uname -r`/systemtap"
rlPhaseEnd
rlJournalEnd
```

The above exemplary script includes 3 setup phases, 4 test phases and 1 cleanup phase. In particular, function rlJournalStart initializes the test engine 204. Function rlJournalEnd triggers the interpretation of the whole test. Function rlPhaseStartSetup starts the setup phase. Function rlPhaseStartTest starts the test phase. Function rlPhaseStartCleanup starts the clean up phase, and function rlPhaseEnd ends the currently open phase and interprets the results. Exemplary conditions or assertions include rlAssert0 that tests for argument equal to 0, rlAssertEquals that checks whether two arguments are equal, rlAssertNotEquals that checks whether two arguments are not equal, rlAssertExists that tests for file existence, and rlAssertNotExist that checks whether the file does not exist. Further, rlAssertRpm tests if an RPM package is installed, rlAssertGrep tests if a file contains some pattern, rlAssertNotGrep checks whether a file does not contain a pattern, rlAssertDiffer tests whether two files are different, and rlAssertNotDiffer tests whether two file are identical. Various other functions and assertions can be included in a script in addition to, or instead of those discussed above.

Figure 3:
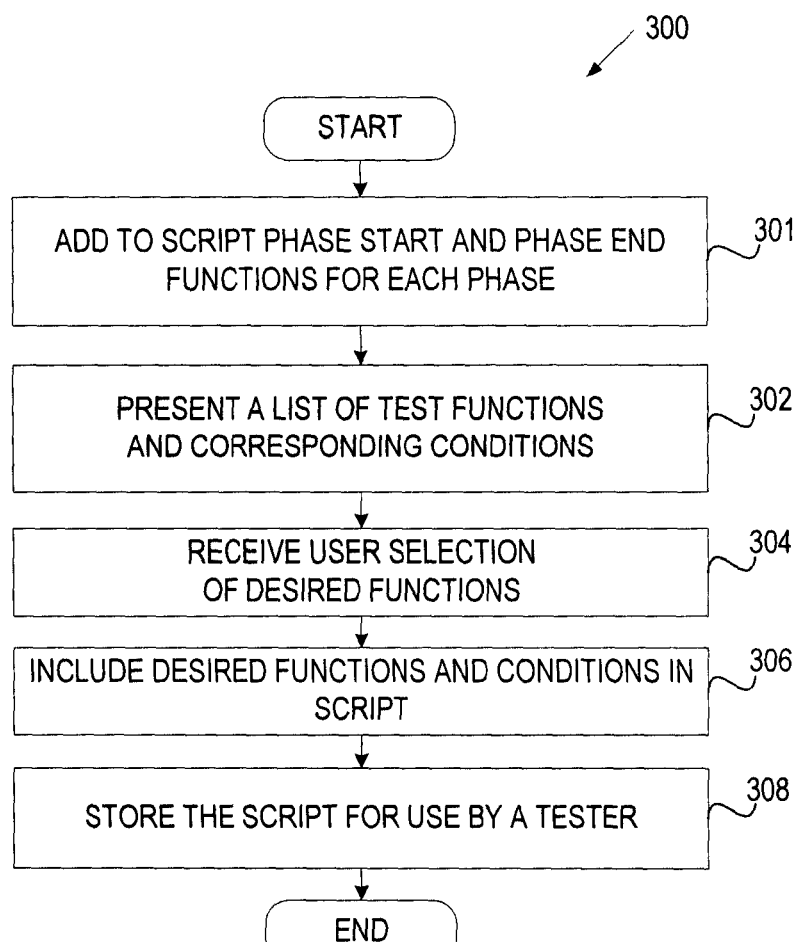
FIG. 3 is a flow diagram of one embodiment of a method for assisting a test author to create a script for phase-based testing of an operating system.

FIG. 3 is a flow diagram of one embodiment of a method 300 for assisting a test author to create a script for phase-based testing of an operating system. The method 300 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 300 is performed by a phase-based test system 104 of FIG. 1.

Referring to FIG. 3, method 300 begins with a script authoring tool adding to the script a phase start function and a phase end function for each of a setup phase, a test phase and a cleanup phase (block 301). At block 302, the script authoring tool presents a list of test functions available for different phases to the test author. At block 304, the script authoring tool receives user selection of desired functions. At block 306, the script authoring tool adds the selected functions to the script. In addition, the script authoring tool adds corresponding conditions to the script. Alternatively, the script authoring tool allows the author to add some or all of the desired functions and/or conditions to the script.

At block 308, the script authoring tool receives a user request to save the script and stores the script in a script store for future use by a tester.

Figure 4:
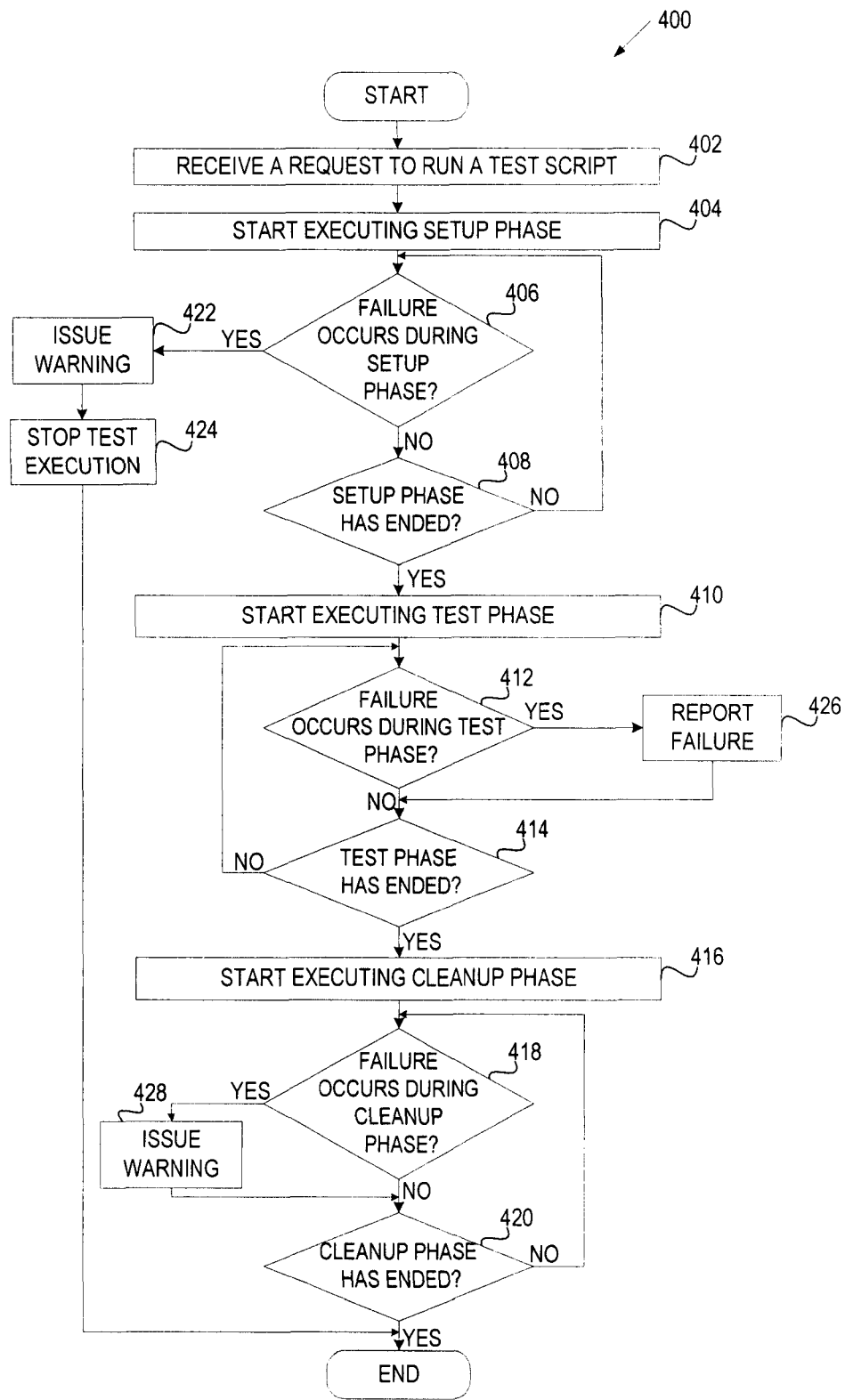
FIG. 4 is a flow diagram of one embodiment of a method for phase-based testing of an operating system.

FIG. 4 is a flow diagram of one embodiment of a phase-based method 400 for testing an operating system. The method 400 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 400 is performed by a testing framework of FIG. 1.

Referring to FIG. 4, method 400 begins with the testing framework receiving a user request to run a test script (block 402). At block 404, the testing framework starts executing a setup phase of the test. At block 406, the testing framework determines whether a failure has occurred during the setup phase. If so, the testing framework issues a warning indicating that the test was not setup properly (block 422) and stops the execution of the test (block 424).

If a failure has not been detected during the setup phase (or multiple setup phases), the testing framework determines whether the setup phase(s) has ended (block 408). If not, the method returns to block 406. If so, the method proceeds to block 410.

At block 410, the testing framework starts executing a test phase. At block 412, the testing framework determines whether a failure has occurred during the test phase. If so, the testing framework reports the failure and provides information pertaining to the failure (block 422). If a failure has not been detected during the test phase (or multiple test phases), the testing framework determines whether the test phase(s) has ended (block 414). If not, the method returns to block 412. If so, the method proceeds to block 416.

At block 416, the testing framework starts executing a cleanup phase. At block 418, the testing framework determines whether a failure has occurred during the cleanup phase. If so, the testing framework issues a warning indicating that the test was not teared down properly (block 428). If not, method 400 ends.

Figure 5:
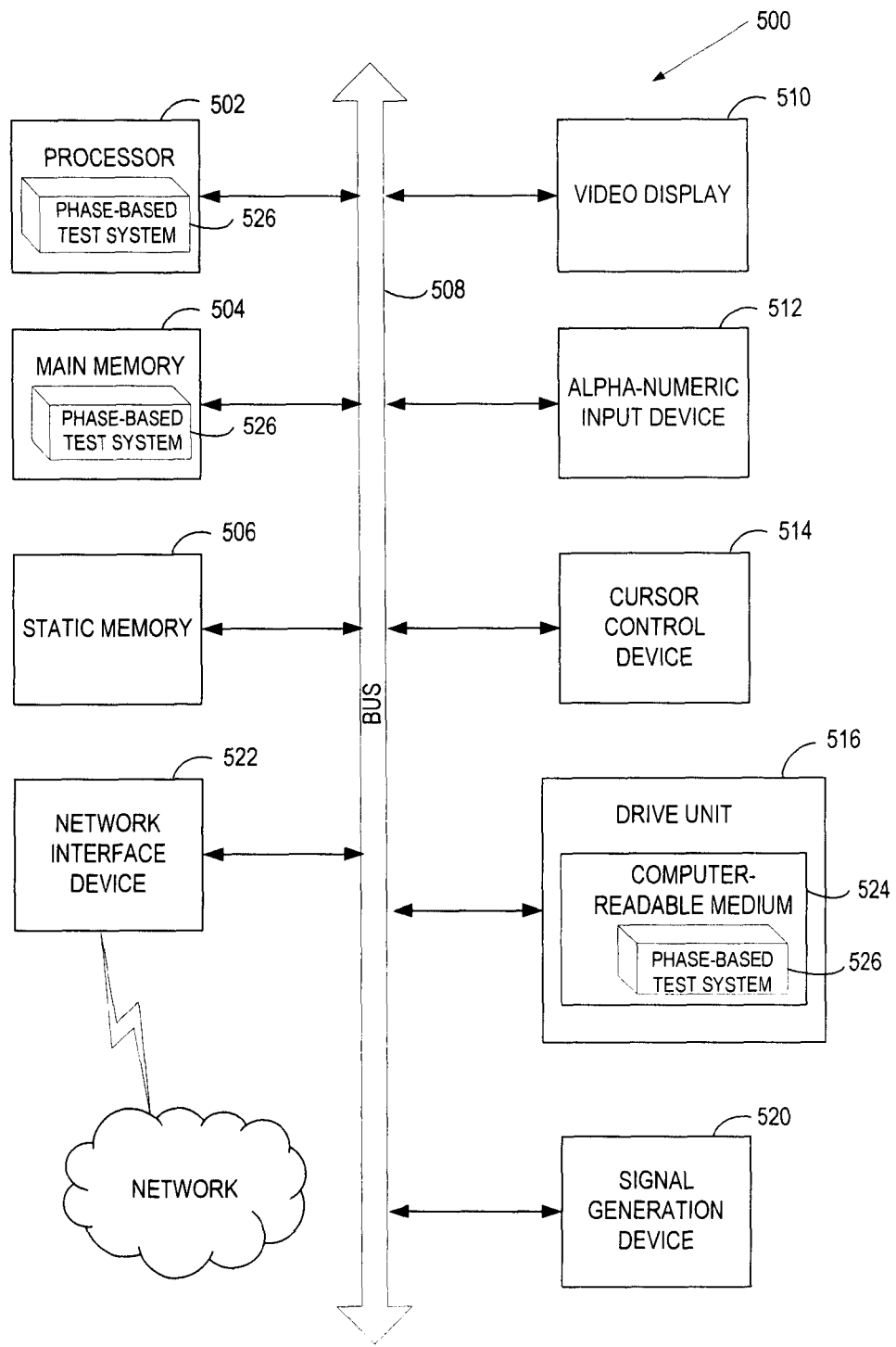
FIG. 5 is a block diagram of one embodiment of a computer system providing phase-based testing of an operating system.

FIG. 5 is a block diagram of one embodiment of a computer system 500 providing phase-based testing of an operating system. Within the computer system 500 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server machine or a client machine in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes one or more processing devices 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 516 (e.g., a data storage device in the form of a drive unit, which may include fixed or removable computer-readable storage medium), which communicate with each other via a bus 508.

Processing devices 502 represent one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute instructions for a phase-based test system 526 for performing the operations and steps discussed herein.

The computer system 500 may further include a network device 110 (e.g., NIC, Ethernet network card, etc.). The computer system 500 also may include a video display unit 510 (e.g., a liquid crystal display (LCD) or a cathode ray tube (CRT)) connected to the computer system through a graphics port and graphics chipset, an alphanumeric input device 512 (e.g., a keyboard), a cursor control device 514 (e.g., a mouse), and a signal generation device 520 (e.g., a speaker).

The secondary memory 516 may include a machine-readable storage medium (or more specifically a computer-readable storage medium) 524 on which is stored one or more sets of instructions for a phase-based test system 526 embodying any one or more of the methodologies or functions described herein. The instructions for a phase-based test system 526 may also reside, completely or at least partially, within the main memory 504 and/or within the processing device 502 during execution thereof by the computer system 500, the main memory 504 and the processing device 502 also constituting machine-readable storage media. The instructions for a phase-based test system 526 may further be transmitted or received over a network 518 via the network device 110.

The computer-readable storage medium 524 may also be used to store the instructions for a phase-based test system 526 persistently. While the computer-readable storage medium 526 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The components and other features described herein (for example in relation to FIG. 1) can be implemented as discrete hardware components or integrated in the functionality of hardware components such as ASICS, FPGAs, DSPs or similar devices. In addition, these components can be implemented as firmware or functional circuitry within hardware devices. Further, these components can be implemented in any combination of hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "creating," "returning," "providing" or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, Flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer-readable storage medium includes any mechanism for storing information in a form readable by a computer. For example, a computer-readable storage medium includes read only memory ("ROM"), random access memory ("RAM"), magnetic disk storage media; optical storage media, flash memory devices or other type of machine-accessible storage media.

Thus, a method and apparatus for phase-based testing of operating systems has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer implemented method, comprising:
receiving, by a computing system, a user request to run a test of an operating system, the test being defined by a script identifying a plurality of phases comprising a setup phase for configuring a test environment, a test phase to detect errors in the operating system, and a cleanup phase to restore the test environment to an initial state, wherein each of the plurality of phases comprises one or more functions, and the script comprises conditions pertaining to each function;
detecting a failure when running the test of the operating system, wherein the failure occurs when one of the conditions in the script is not satisfied;
identifying, by the computing system and based on the conditions in the script, one of the plurality of phases in which the failure has occurred;
if the failure occurred during the setup phase, discontinuing to run the test of the operating system, and reporting the failure during the setup phase to a user;
if the failure occurred during the test phase, determining performance measurements at a time of the failure, reporting the failure during the test phase and the performance measurements to the user, and continuing to run the test; and
if the failure occurred during the cleanup phase, reporting the failure during the cleanup phase to the user.

2. The method of claim 1 wherein detecting the failure comprises:
performing a function specified in the test; and
determining that a condition pertaining to the function is not satisfied.

3. The method of claim 1 further comprising:
creating the script based on input of a test author.

4. The method of claim 3 wherein creating the script comprises:
presenting a list of functions available for testing, the list of functions including a start phase function and an end phase function for each of the plurality of phases;
receiving an author selection of desired functions;
including the selected functions in the script; and
causing the script to be accessible to the user.

5. A non-transitory computer readable storage medium comprising instruction, which when executed by a processor, cause the processor to perform a method comprising:
receiving, by a computing system, a user request to run a test of an operating system, the test being defined by a script identifying a plurality of phases comprising a setup phase for configuring a test environment, a test phase to detect errors in the operating system, and a cleanup phase to restore the test environment to an initial state, wherein each of the plurality of functions comprises one or more functions, and the script comprises conditions pertaining to each function;
detecting a failure when running the test of the operating system, wherein the failure occurs when one of the conditions in the script is not satisfied;
identifying, by the computing system and based on the conditions in the script, one of the plurality of phases in which the failure has occurred;
if the failure occurred during the setup phase, discontinuing to run the test of the operating system, and reporting the failure during the setup phase to a user;
if the failure occurred during the test phase, determining performance measurements at a time of the failure, reporting the failure during the test phase and the performance measurements to the user, and continuing to run the test; and
if the failure occurred during the cleanup phase, reporting the failure during the cleanup phase to the user.

6. The computer readable storage medium of claim 5 wherein detecting the failure comprises:

performing a function specified in the test; and determining that a condition pertaining to the function is not satisfied.

7. The computer readable storage medium of claim 5 wherein the method further comprises:

creating the script based on input of a test author, wherein creating the script comprises:

presenting a list of functions available for testing, the list of functions including a start phase function and an end phase function for each of the plurality of phases;

receiving an author selection of desired functions;

including the selected functions in the script; and causing the script to be accessible to the user.

8. A system comprising:

a memory; and a processor, coupled to the memory to:

receive a user request to run a test of an operating system, the test being defined by a script identifying a plurality of phases comprising a setup phase for configuring a test environment, a test phase to detect errors in the operating system, and a cleanup phase to restore the test environment to an initial state, wherein each of the plurality of phases comprises one or more functions, and the script comprises conditions pertaining to each function;

detect a failure when running the test of the operating system, wherein the failure occurs when one of the conditions in the script is not satisfied;

identify, based on the conditions in the script, one of the plurality of phases in which the failure has occurred;

if the failure occurred during the setup phase, discontinue running the test of the operating system, and reporting the failure during the setup phase to a user;

if the failure occurred during the test phase, determine performance measurements at a time of the failure, report the failure during the test phase and the performance measurements to the user, and continuing to run the test; and if the failure occurred during the cleanup phase, report the failure during the cleanup phase to the user.

9. The system of claim 8 wherein the processor is further to create the script based on input of a test author by:

presenting a list of functions available for testing, the list of functions including a start phase function and an end phase function for each of the plurality of phases;

receiving an author selection of desired functions;

including the selected functions in the script; and causing the script to be accessible to the user.

\* \* \* \* \*